UNITED STATES PATENT OFFICE.

DANIEL O'KEEFE, OF ST. LOUIS, MISSOURI.

COMPOSITION OF MATTER FOR THE TREATMENT OF LEATHER, FABRICS, AND THE LIKE.

1,020,927.  Specification of Letters Patent.  Patented Mar. 19, 1912.

No Drawing.  Application filed March 13, 1911.  Serial No. 614,009.

*To all whom it may concern:*

Be it known that I, DANIEL O'KEEFE, a citizen of the United States, and resident of St. Louis, Missouri, have invented a new and useful Composition of Matter to be Used for the Treatment of Leather, Fabrics, and the Like, of which the following is a specification.

My invention relates to a composition of matter for the treatment of leather, fabrics, and the like, and consists of the following ingredients, combined in substantially the proportions stated:

| Ingredient | Percent |
|---|---|
| Petroleum oil | 37% |
| Fish oil | 30% |
| Bay oil | 2% |
| Cedar oil | 3% |
| Mirbane oil | 6% |
| Mustard oil | 3% |
| Venice turpentine | 18% |
| Azalea oil | 1% |
| Total | 100% |

These ingredients are to be thoroughly mixed.

My composition is useful for the treatment of leather to render it pliable and waterproof and increasing the tensile strength of the same and renders the leather so treated non-inflammable, and it is useful in applying it to furs on the flesh side of the skin, thus preventing the hair from falling out, and it is also a germicidal agent. It is useful in applying it to any fabric to render the same pliable and waterproof, and it also may be used on any surface, whether wood, stone, leather or fabric, which contains pores which are not sealed with any other material, and it renders the substance so treated practically impervious to moisture.

My composition has wonderful penetrating power, and leaves no smeared, oily surface. I have found out by numerous tests that when my composition has been applied to leather it not only renders it impervious to moisture, but increases the tensile strength and renders the same highly pliable.

My composition is free from any disagreeable odor, is non-poisonous and non-inflammable, and it can be applied to any fabric or material and renders the same practically impervious to moisture; and, as heretofore stated, from the numerous tests that I have made with my composition, it increases the strength of all fabrics to which I have applied it. I have furthermore found out that my composition does not vaporize when subjected to atmospheric conditions or influences.

My composition is prepared without the agency of calorific energies, thus preserving in the composition all the merits of each individual ingredient, and while my composition is, as it were, mechanically mixed, I fully believe, with my knowledge of chemistry, that the composition is chemically combined, for the reason that the composition does not show any stratification or any precipitation of the various ingredients composing the compound under all natural conditions of time, heat, cold and agitation.

In a companion application, filed by me March 13, 1911, Serial No. 614,008, I have claimed the process by which I make my composition of matter, and such process is not claimed herein.

The essential ingredients of my composition are the petroleum oil, fish oil, cedar oil, mirbane oil and Venice turpentine. The bay oil and mustard oil intensify the action of the previously named ingredients, and the addition of azalea oil destroys the extremely unpleasant odors of some of the ingredients of the composition.

I claim:

1. The herein described composition of matter, consisting of petroleum oil, fish oil, bay oil, cedar oil, mirbane oil, mustard oil and Venice turpentine.

2. The herein described composition of matter, consisting of petroleum oil, fish oil, bay oil, cedar oil, mirbane oil, mustard oil, Venice turpentine and azalea oil.

3. The herein described composition of matter for rendering leather, fabrics, and the like, impervious to moisture, consisting of petroleum oil, about 37%; fish oil, about 30%; bay oil, about 2%; cedar oil, about 3%; mirbane oil, about 6%; mustard oil, about 3%; Venice turpentine, about 18%; and azalea oil, about 1%.

4. The herein described composition of matter, consisting of petroleum oil, fish oil, cedar oil, mirbane oil and Venice turpentine.

In testimony whereof, I have signed my name to this specification, in presence of two subscribing witnesses.

DANIEL O'KEEFE.

Witnesses:
EDWARD E. LONGAN,
E. L. WALLACE.